Patented July 10, 1951

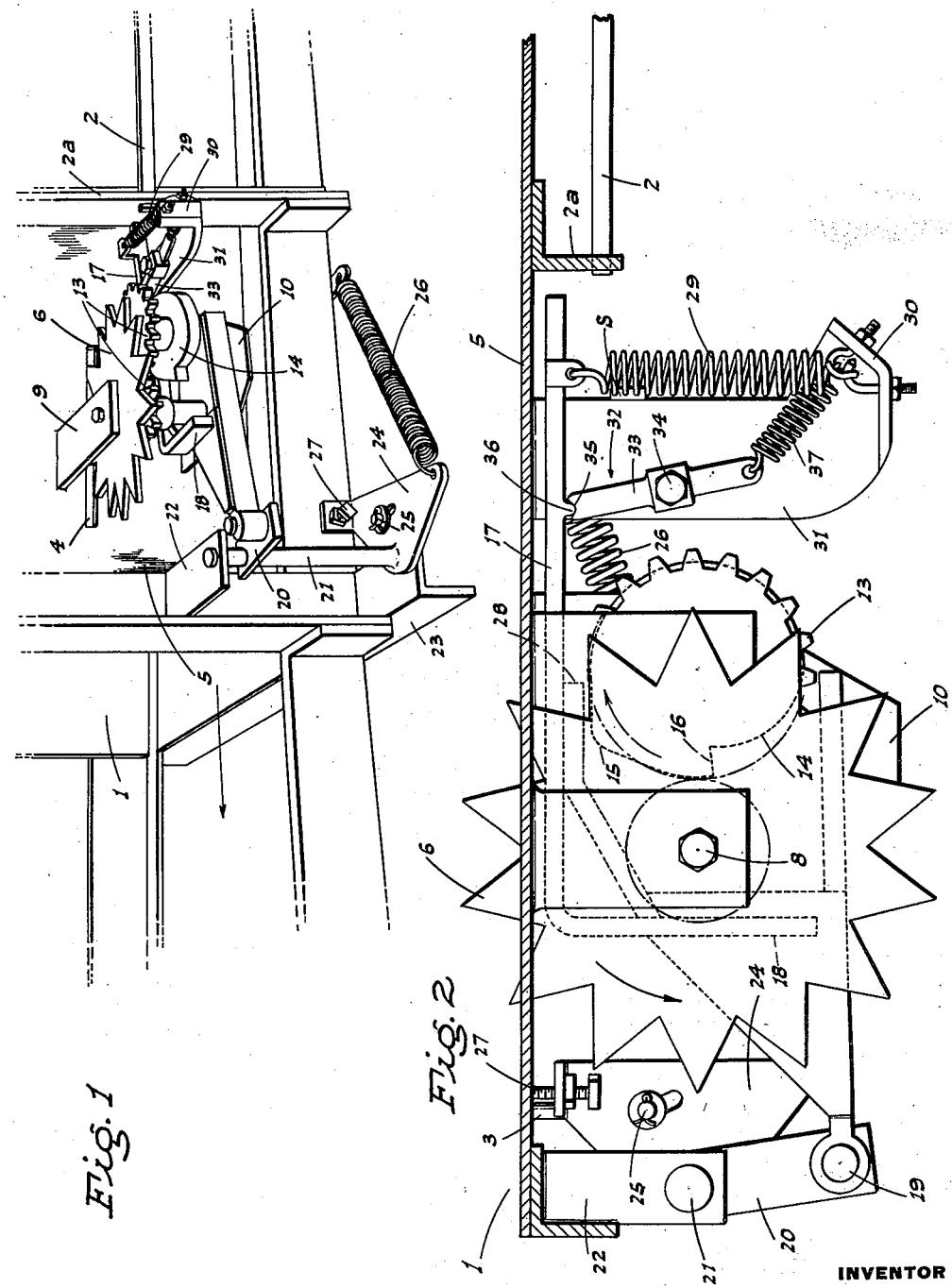

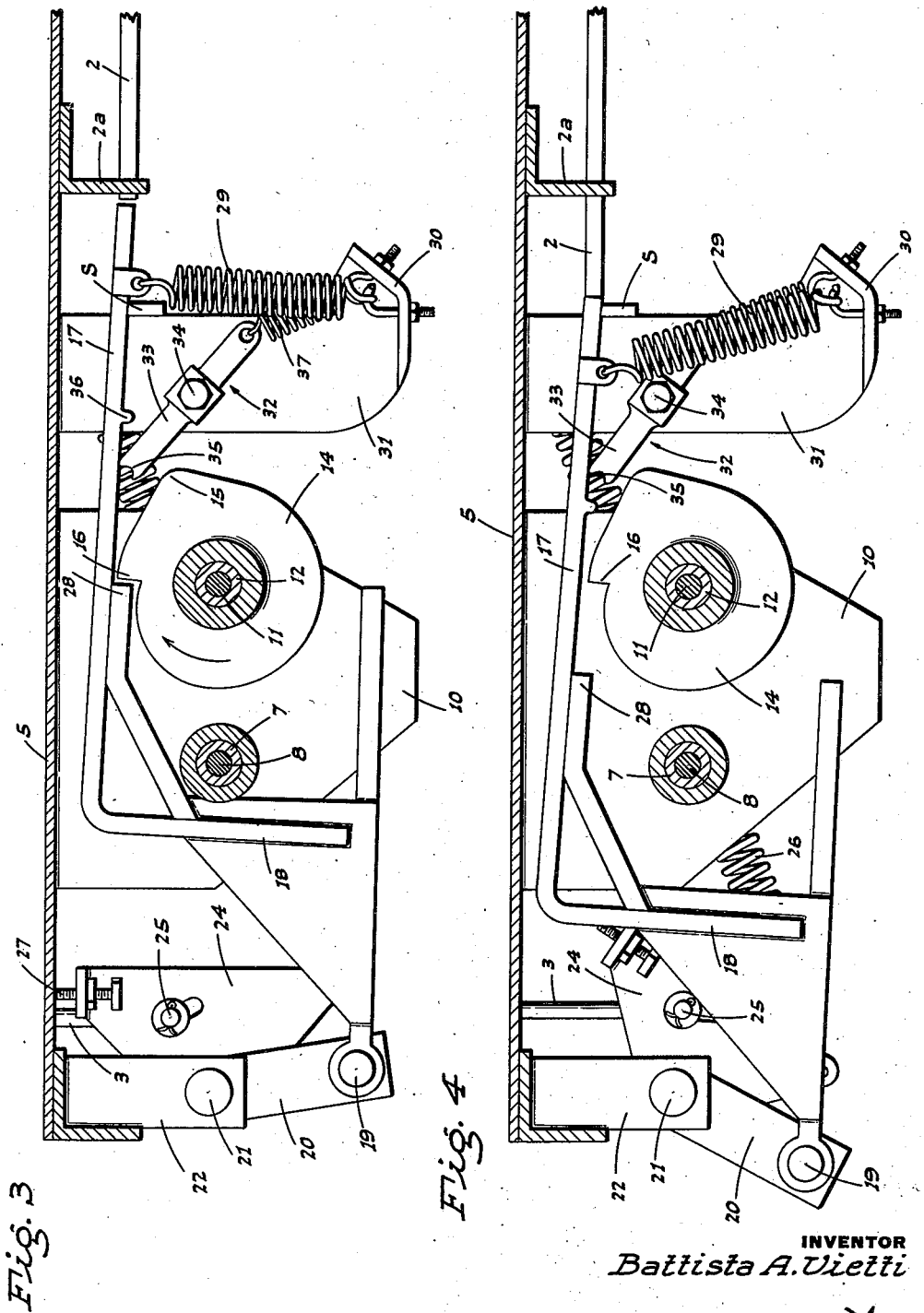

2,560,143

UNITED STATES PATENT OFFICE 2,560,143

TRIP UNIT FOR AUTOMATIC BALING MACHINES

Battista A. Vietti, Reno, Nev.

Application November 6, 1950, Serial No. 194,283

5 Claims. (Cl. 100—20)

1

The present invention is directed to, and it is an object to provide, a novel trip unit for automatic baling machines; such trip unit being responsive to bale motion and operative to cause engagement, at the proper moment, of the needle arm clutch which is included in the wire applying mechanism of the baling machine.

In the baling machine, of the type for which the trip unit is designed, there is a push bar which reciprocates with the plunger but outside the bale case, a star wheel which works in part in said case and is turned by the bale as it is formed and advanced, and a shiftable control rod which initiates operation of the needle arm clutch; it being an important object of the present invention to provide for shifting of the control rod by the push bar upon response of the novel trip unit to predetermined rotation of the star wheel.

A further object of the invention is to provide a trip unit, for the purpose described, which includes a novel latch mechanism for normally maintaining the trip unit out of operation; such latch mechanism being released and subsequently reset in a unique manner.

An additional object of the invention is to provide a trip unit, for the purpose described, which is rugged, and not subject to any substantial wear or tear under normal operating conditions.

It is also an object of the invention to provide a trip unit for automatic baling machines which is designed for ease and economy of manufacture.

Still another object of the invention is to provide a practical and reliable trip unit for automatic baling machines, and yet one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of the trip unit as mounted in connection with one side of the bale case of an automatic baling machine.

Fig. 2 is an enlarged top plan view of the trip unit in its normal, or latched out-of-operation, position.

Fig. 3 is an enlarged sectional plan view of the trip unit taken directly below the star wheel actuated gear train; the view showing the trip unit as released for operation, but before shifting of the thrust arm by the reciprocating push bar.

Fig. 4 is a similar view, but shows the thrust arm as shifted by said reciprocating push bar.

Referring now more particularly to the charac-

2 ters of reference on the drawings, the trip unit is especially designed for use in connection with an automatic baling machine which includes a longitudinally extending bale case 1 in which the hay bales (not shown) are formed, moving in the direction indicated in Fig. 1.

A reciprocating push bar 2 is mounted exteriorly of, and is supported for motion along, one side of the bale case 1 exteriorly of the latter; such reciprocating push bar 2 being actuated from the plunger mechanism (not shown) of the baling machine. At its rear end portion the reciprocating push bar 2 works in guided relation through a vertical angle iron 2a.

Below the bale case 1 there is a transversely extending control rod 3, shifting of which in a predetermined direction initiates operation of the needle arm clutch (not shown) of the wire applying mechanism of the baling machine.

On the same side of the bale case as the push bar 2, said case is formed with a longitudinal slot 4 in the sidewall 5, and a horizontally disposed star wheel 6 projects—from exteriorly of the case 1—peripherally through said slot 4 for engagement with the bale as formed and advanced in the bale case 1.

The purpose of the trip mechanism, to which this invention is directed, is to cause shifting, at the proper time, of the control rod 3 by the reciprocating push bar 2, with the trip mechanism brought into play by predetermined rotation of the star wheel 6 in response to bale advance in the case 1.

The baling machine for which the present trip mechanism is designed is that known as the "Bale-O-Matic," manufactured by Minneapolis-Moline Power Implement Co., of Minneapolis, Minnesota, which baling machine is shown in detail in Assembly, Operation and Maintenance Manual of said company, No. S-133A.

The trip mechanism, to which the invention is directed, comprises the following:

The star wheel 6 is fixed on a bearing sleeve 7 turnable on an upstanding spindle 8 which extends between a top bracket 9 and a lower mounting plate 10, both projecting laterally outwardly from the sidewall 5. Another spindle 11 extends up from the mounting plate 10 in spaced relation to the spindle 8, and such spindle 11 carries a bearing sleeve 12. Below the star wheel 6 there is a reduction gear grain 13, one gear being on the sleeve 7, and the other gear being on the sleeve 12, whereby the sleeve 12 is rotated by the star wheel 6, but with a reduction.

On sleeve 12, below the gear, there is a rotary cam 14 which includes a high point 15 which leads a drop-off 16; the high point 15 and drop-off 16 being in adjacent relation circumferentially of said cam.

A longitudinally shiftable, laterally swingable thrust arm 17 extends between the rotary cam 14 and sidewall 5, and rearwardly of the spindle 8 such thrust arm is formed with a lateral offset 18; the rear end of said thrust arm being pivotally connected, as at 19, to a short lever arm 20 which projects radially in an outward direction from a vertical shaft 21 journaled between a top bracket 22 and an extended bottom cross beam 23.

Adjacent its lower end the vertical shaft 21 is fitted with a bellcrank plate 24, and the control rod 3 is connected to said bellcrank plate 24, as at 25.

A tension spring 26 connects between the outer end of the bellcrank plate 24 and the bale case 1; such spring tending to rotate the bellcrank plate 24 so as to shift the control rod 3 in a direction towards the opposite side of the bale case 1, and to advance the thrust arm 17.

An adjustment screw 27 on the inner end of the bellcrank plate 24 abuts the sidewall 5 and limits the extent to which the bellcrank plate 24 can shift the control rod in the above direction.

Adjacent the rotary cam 14 the thrust arm 17 is formed with a shoulder block 28; such shoulder block 28 being positioned so that with each revolution of the rotary cam 14, the thrust arm 17 is first shifted slightly laterally inwardly by the high point 15, and is then permitted to swing laterally outwardly a relatively greater distance as the shoulder block 28 escapes the drop-off 16. The laterally inward motion of the thrust arm 17 is to release a latching mechanism, hereinafter described, while the subsequent laterally outward motion of the thrust arm 17 is to place said arm in alinement with the reciprocating push bar 2 for actuation by the latter.

A tension spring 29 connected between the forward end of the thrust arm 17 and the upstanding outer end 30 of a laterally outwardly projecting mounting plate 31 urges the thrust arm 17 laterally outwardly at all times, but said arm is normally maintained in an inward position out of alinement with the reciprocating push bar 2, as in Fig. 2, by means of a latching mechanism, indicated generally at 32. The latching mechanism 32 comprises a horizontally swingable latch arm 33 pivoted, as at 34, to the mounting plate 31 in longitudinally adjustable relation; such latch arm 32 being notched at its inner end, as at 35, and such notched end normally having engaged therein a cooperating nub 36 on the thrust arm 17. This engagement of the nub 36 in the notch 35 occurs upon advance of the thrust arm 17 by the tension spring 26, and with such advance the latch arm 33 swings the thrust arm 17 laterally inwardly out of alinement with respect to the reciprocating push bar 2. As the thrust arm 17 so advances and is swung laterally inwardly, the swinging latch arm 33 tensions a spring 37 which connects between the outer end of said latch arm 33 and the upstanding outer end 30 of the mounting plate 31. Thus, in the normal or starting position of the thrust arm 17 it is not engaged or effected by reciprocation of the push bar 2.

As a bale is formed in the bale case 1 and moves in the indicated direction, being engaged by the star wheel 6, such star wheel rotates; such rotation being imparted through the reduction gear train 13 to the rotary cam 14.

After the bale has moved a predetermined distance, and at which time it is desired to bring the trip unit into play, the star wheel 6 has rotated the rotary cam 14, so that the high point 15 first shifts the thrust arm 17 slightly laterally inwardly from its normal position, as in Fig. 2, permitting the latch arm 33 to escape from its normally latched position, as in said figure, to its released position, as in Fig. 3, diagonaling toward the thrust arm 17 in the direction of the rotary cam 14, and temporarily leaving the nub 36 behind.

Shortly thereafter the shoulder block 28 escapes the drop-off 16, whereupon the thrust arm 17 is swung laterally outwardly by the tension spring 29 to a position in end to end alinement with the reciprocating push bar 2, as shown in said Fig. 3. The thrust arm 17 cannot pass beyond this position, by reason of its engagement with a stop S. After this occurs, the reciprocating push bar 2 engages the adjacent end of the thrust arm and shifts it rearwardly, as in Fig. 4, with resulting swinging of the radial arm 20 and part-circle rotation of the shaft 21 and bellcrank plate 24, pulling the control rod 3 in a direction toward the near side of the bale case 1. At the same time the nub 36 is advanced toward the rotary cam 14 and to a point ahead of the adjacent end of the latch arm 33.

Such motion of the control rod 3 initiates operation of the needle arm clutch (not shown) of the wire applying mechanism of the baling machine. The timing of this operation is accurate, for the reason that the trip unit functions in response to rotation of the star wheel 6, and the latter motion is in direct relation to bale length.

After the control rod 3 is actuated, as above, and upon forward motion of the push bar 2, the thrust arm 17 is likewise advanced by the tension spring 26 and picks up the latch arm 33, the nub 36 engaging in the notch 35 and said latch arm 33 swinging the thrust arm 17 laterally inwardly to its normal or starting position clear of the push bar 2. The parts remain in this position until the rotary cam 14 makes its next revolution, whereupon the described cycle is repeated.

With such arrangement the trip unit recurringly—with proper timing—actuates the control rod 3, and then returns to normal position.

The described trip unit, while being very practical and reliable, is rugged in structure, requires a minimum of maintenance, and is subject to very little wear and tear during normal operation.

One reason for the lack of wear is the fact that the rotary cam 14 runs in spaced relation to the shoulder block 28 for a major portion of the circumference of such cam, being engaged by the latter only adjacent the high point 15 and drop-off 16.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a trip unit, for control of a working part of an automatic baling machine, which includes a reciprocating push bar, a longitudinally shiftable thrust bar laterally swingable between one position clear of said push bar and another position for end to end engagement and longitudinal shifting in one direction thereby, shifting of the thrust arm in said one direction controlling said working part, yieldable means tending to shift the thrust arm longitudinally in the opposite direction and laterally toward said other position, a rotary cam mounted to cooperate with the thrust arm, and a bale engaging star wheel driving the rotary cam; a releasable latch mechanism normally engaging the thrust arm holding the same in said one position, said latch mechanism being releasable upon lateral swinging of the thrust arm further away from said other position, and points on the rotary cam operative, recurringly, to first swing the thrust arm from said one position to further away from said other position, and to then permit the thrust arm to swing back to said other position for engagement, and longitudinal shifting in said one direction, by the push bar.

2. A trip unit, as in claim 1, wherein the latch mechanism and thrust arm include cooperating elements arranged to cause resetting of said mechanism upon longitudinal shifting of the thrust arm opposite said one direction.

3. In a trip unit, for control of a working part of an automatic baling machine, which includes a reciprocating push bar, a longitudinally shiftable thrust bar laterally swingable between one position clear of said push bar and another position for end to end engagement and longitudinal shifting in one direction thereby, shifting of the thrust arm in said one direction controlling said working part, yieldable means tending to shift the thrust arm longitudinally in the opposite direction and laterally toward said other position, a rotary cam mounted to cooperate with the thrust arm, and a bale engaging star wheel driving the rotary cam; a latch arm mounted adjacent the thrust arm for swinging motion in the direction of longitudinal shifting of the thrust arm, the latch arm normally holding the thrust arm in said one position, yieldable means tending to swing the latch arm to release it from the thrust arm, cooperating elements between the thrust arm and latch arm normally preventing said release swinging of the latter, said elements being separable and the latch arm released only upon lateral swinging of the thrust arm further away from said other position, and points on the rotary cam operative, recurringly, to first swing the thrust arm from said one position to further away from said other position, and to then permit the thrust arm to swing back to said other position for engagement and longitudinal shifting in said one direction by the push bar.

4. A trip unit, as in claim 3, in which said cooperating elements on the thrust arm and latch arm reengage, causing resetting of the latter, upon longitudinal shifting of the thrust arm opposite said one direction.

5. In a trip unit, for control of a working part of an automatic baling machine, which includes a reciprocating push bar, a longitudinally shiftable thrust bar laterally swingable between one position clear of said push bar and another position for end to end engagement and longitudinal shifting in one direction thereby, shifting of the thrust arm in said one direction controlling said working part, yieldable means tending to shift the thrust arm longitudinally in the opposite direction and laterally toward said other position, a rotary cam mounted to cooperate with the thrust arm, and a bale engaging star wheel driving the rotary cam; a latch arm mounted adjacent the thrust arm for swinging motion in the direction of longitudinal shifting of the thrust arm, the latch arm normally holding the thrust arm in said one position, yieldable means tending to swing the latch arm to release it from the thrust arm, cooperating elements between the thrust arm and latch arm normally preventing said release swinging of the latter, said elements being separable and the latch arm released only upon lateral swinging of the thrust arm further away from said other position, and points on the rotary cam operative, recurringly, to first swing the thrust arm from said one position to further away from said other position, and to then permit the thrust arm to swing back to said other position for engagement and longitudinal shifting in said one direction by the push bar; the latch arm, when released, diagonaling toward the thrust arm generally in said one direction, and said elements being disposed on the thrust arm and adjacent end of the latch arm, engaging as the thrust arm shifts opposite said one direction.

BATTISTA A. VIETTI.

REFERENCES CITED

The following references are of record in the file of this patent:

UNITED STATES PATENTS

| Number | Name | Date |
|---|---|---|
| 2,548,559 | Ronning et al. | Apr. 10, 1951 |